United States Patent
Centurion

(10) Patent No.: US 10,364,672 B2
(45) Date of Patent: Jul. 30, 2019

(54) COMPLETION OPTIMIZATION PROCESS BASED ON ACOUSTIC LOGGING DATA IN THE LATERAL SECTION IN A HORIZONTAL WELL

(71) Applicant: Sergio Centurion, San Antonio, TX (US)

(72) Inventor: Sergio Centurion, San Antonio, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 506 days.

(21) Appl. No.: 15/082,148

(22) Filed: Mar. 28, 2016

(65) Prior Publication Data

US 2017/0275988 A1    Sep. 28, 2017

(51) Int. Cl.
| | |
|---|---|
| G01V 1/40 | (2006.01) |
| E21B 43/26 | (2006.01) |
| E21B 43/30 | (2006.01) |
| E21B 49/00 | (2006.01) |
| E21B 43/116 | (2006.01) |
| E21B 43/119 | (2006.01) |

(52) U.S. Cl.
CPC ............ *E21B 49/00* (2013.01); *E21B 43/116* (2013.01); *E21B 43/119* (2013.01); *E21B 43/26* (2013.01); *E21B 43/305* (2013.01); *G01V 1/40* (2013.01)

(58) Field of Classification Search
CPC ...... E21B 49/00; E21B 43/116; E21B 43/119; E21B 43/26; E21B 43/305; G01V 1/40
See application file for complete search history.

(56) References Cited

U.S. PATENT DOCUMENTS

2011/0182144 A1    7/2011   Gray
2012/0325462 A1   12/2012   Roussel et al.
(Continued)

OTHER PUBLICATIONS

Bo Zhang, "Brittleness evaluation of resource plays by integrating petrophysical and seismic data analysis", May 2015, Interpretation, vol. 3, No. 2; p. T81-T82 (Year: 2015).*

(Continued)

*Primary Examiner* — Regis J Betsch
(74) *Attorney, Agent, or Firm* — Cantor Colburn LLP

(57) ABSTRACT

Methods and systems for optimizing the placement of perforation clusters in horizontal wells for completion include conveying a carrier through a borehole into a horizontal section of the borehole; obtaining acoustic data using one or more acoustic sensors; defining a first location for each of a plurality of perforation clusters based on a geometrical distribution; identifying a minimum horizontal stress ($S_{hmin}$) for each first location based on the acoustic data; calculating a differential net pressure for the first locations based on the minimum horizontal stress ($S_{hmin}$) for each first location; adjusting the location of each of the plurality of perforation clusters to a respective second location such that the differential net pressure of the second locations is less than the differential net pressure of the first locations; and deploying a plurality of perforation clusters to the second locations such that fracturing of a formation at the second locations is achieved.

13 Claims, 5 Drawing Sheets

(56) References Cited

U.S. PATENT DOCUMENTS

| | | | | |
|---|---|---|---|---|
| 2013/0032349 | A1* | 2/2013 | Alekseenko | E21B 43/26 |
| | | | | 166/308.1 |
| 2013/0220604 | A1 | 8/2013 | El-Rabba et al. | |
| 2014/0222405 | A1 | 8/2014 | Lecerf et al. | |
| 2015/0176387 | A1* | 6/2015 | Wutherich | E21B 43/26 |
| | | | | 166/250.1 |
| 2016/0108705 | A1* | 4/2016 | Maxwell | E21B 43/267 |
| | | | | 166/250.1 |
| 2017/0051598 | A1* | 2/2017 | Ouenes | E21B 43/26 |
| 2017/0114613 | A1* | 4/2017 | Lecerf | E21B 41/0092 |

OTHER PUBLICATIONS

Cheng et al., "Boundary Element Analysis of the Stress Distribution around Multiple Fractures: Implications for the Spacing of Perforation Clusters of Hydraulically Fractured Horizontal Wells", Sep. 2009 SPE Eastern Regional Meeting in Charleston WV USA, 23-25 (Year: 2009).*

Meyer et al., "A Discrete Fracture Network Model for Hydraulically Induced Fractures: Theory, Parametric and Case Studies", Jan. 2011 SPE Hydraulic Fracturing Technology Conference and Exhibition held in The Woodlands. Texas. USA, 24-26 (Year: 2011).*

International Search Report and Written Opinion, International Application No. PCT/US2017/024044, dated Jul. 6, 2017, Korean Intellectual Property Office; International Search Report 4 pages, Written Opinion 11 pages.

"Hydraulic Fracturing: An Environmentally Responsible Technology for Ensuring Our Energy Future", Baker Hughes Incorporated (2012); 10 pages.

* cited by examiner

COMPLETION OPTIMIZATION PROCESS BASED ON ACOUSTIC LOGGING DATA IN THE LATERAL SECTION IN A HORIZONTAL WELL

BACKGROUND

Since the beginning of shale development and production therefrom, drilling and completing as many wells as possible in the least time has been and continues to be an important focus of optimization. Time and cost are easy to measure and the industry has made enormous strides in reducing both days and cost-per-foot for a completed well. In shale basins, this efficiency may be reaching a limit with existing practices, and operators are spending more effort on improving the production response by optimizing the completion process.

There are many different types of completion. One type is referred to as perforate-and-plug. In this type of completion, a set of clusters are perforated, usually following a geometrical distribution, and treated with a technique of hydraulic fracturing simultaneously. Regarding optimized completion processes, there has been a focus on increasing the stimulated reservoir volume (SRV), increasing the complexity of the fracturing created network, etc. However, a primary issue that affects a production response is a lack of having the entire lateral stimulated, that is, not all sections that are perforated end up producing. Accordingly, during completion, there may be a percentage of the clusters that do not produce or may suffer from reduced production.

SUMMARY

Methods for optimizing the placement of perforation clusters in a horizontal well for completion of said well are provided. The methods includes conveying a carrier through a borehole into a horizontal section of the borehole; obtaining acoustic data using one or more acoustic sensors; defining a first location for each of a plurality of perforation clusters based on a geometrical distribution; identifying a minimum horizontal stress ($S_{hmin}$) for each first location based on the acoustic data; calculating a differential net pressure for the first locations based on the minimum horizontal stress ($S_{hmin}$) for each first location; adjusting the location of each of the plurality of perforation clusters to a respective second location such that the differential net pressure of the second locations is less than the differential net pressure of the first locations; and deploying a plurality of perforation clusters to the second locations such that fracturing of a formation at the second locations is achieved.

Systems for optimizing the placement of perforation clusters in a horizontal well for completion of said well are provided. The systems includes a carrier configured to be conveyed through a borehole; at least one sensor configured to obtain acoustic data downhole; and a processor configured to optimize placement of a plurality of perforation clusters in a second of horizontal well. The system is configured to obtain acoustic data using the at least one sensor; define a first location for each of a plurality of perforation clusters based on a geometrical distribution; identify a minimum horizontal stress ($S_{hmin}$) for each first location based on the acoustic data; calculate a differential net pressure for the first locations based on the minimum horizontal stress ($S_{hmin}$) for each first location; and adjust the location of each of the plurality of perforation clusters to a respective second location such that the differential net pressure of the second locations is less than the differential net pressure of the first locations.

BRIEF DESCRIPTION OF THE DRAWINGS

The following descriptions should not be considered limiting in any way. With reference to the accompanying drawings, like elements are numbered alike.

The detailed description explains embodiments of the present disclosure, together with advantages and features, by way of example with reference to the drawings.

DETAILED DESCRIPTION

A detailed description of one or more embodiments of the disclosed apparatuses and methods presented herein are presented by way of exemplification and not limitation, with reference made to the appended figures.

Disclosed are methods and systems for optimizing cluster production during completion of horizontal wells. As provided herein, optimization of the location of clusters of different stages of a horizontal well is achieved, thus providing an effective means of fracturing a formation and extracting materials therefrom. During drilling and subsequent preparation for completion of a well or borehole, acoustic logging is carried out and information related to the formation around the borehole is obtained. The acoustic logging can be used to determine minimum horizontal stress ($S_{hmin}$) and brittleness index (BI) of the lateral portions of a horizontal well. The measured minimum horizontal stress ($S_{hmin}$) and brittleness index (BI) can be used to optimize positioning of clusters and thus optimization of production may be achieved.

Figure 1:
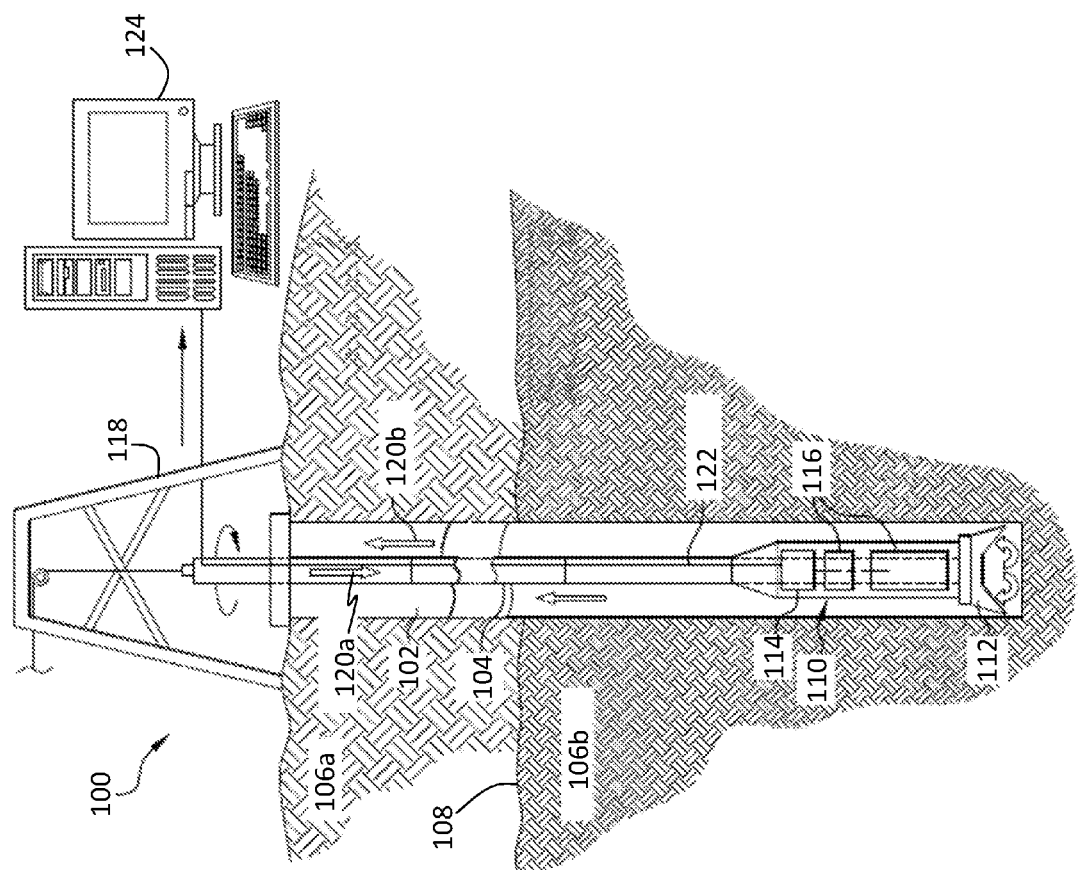
FIG. 1 is a schematic illustration of an embodiment of a downhole drilling, monitoring, evaluation, exploration and/or production system in accordance with an embodiment of the present disclosure.

Referring to FIG. 1, a non-limiting schematic illustration of a downhole drilling, monitoring, evaluation, exploration, and/or production system 100 associated with a borehole 102 is shown. A carrier 104 is run in the borehole 102, which penetrates one or more earth formations 106a, 106b for facilitating operations such as drilling, extracting matter or material from the formation, sequestering fluids such as carbon dioxide, and/or making measurements of properties of the formations 106a, 106b, a formation interface 108 (i.e., the interface between the formations 106a, 106b), and/or the borehole 102 downhole. The carrier 104 includes any of various components to facilitate subterranean operations. In various embodiments, the carrier 104 is constructed of, for example, a pipe, multiple pipe sections, flexible tubing, or other structures. In other configurations, the carrier 104 is constructed of an armored wireline, such as that used in wireline logging. The carrier 104 is configured to include, for example, a drilling system and/or a bottom-hole assembly (BHA) on a downhole end thereof.

The system 100 and/or the carrier 104 may include any number of downhole tools 110 for various processes including drilling, completion, hydrocarbon production, and/or formation evaluation for measuring one or more physical properties, characteristics, quantities, etc. in and/or around the borehole 102. For example, in some embodiments, the downhole tools 110 include a drilling assembly 112 and/or a pumping assembly 114. Various measurement tools can be incorporated into the system 100 to affect measurement regimes such as wireline measurement applications, measurement-while-drilling (MWD), and/or logging-while-drilling (LWD) applications.

While the system 100 may operate in any subsurface environment, FIG. 1 shows the downhole tools 110 disposed in the borehole 102 penetrating the earth, including the first formation 106a and the second formation 106b. The downhole tools 110 are disposed in the borehole 102 at a distal end of the carrier 104. As shown, the downhole tools 110 include measurement tools and/or downhole electronics 116 configured to perform one or more types of measurements in LWD or MWD applications and/or operations. In a LWD or MWD configuration, the carrier 104 is a drill string. The measurements may include measurements related to drill string operation, for example.

A drilling rig 118 is configured to conduct drilling operations such as rotating the carrier 104 (e.g., a drill string) and, thus, a drill bit of the drilling assembly 112 located on the distal end of the carrier 104. As shown, the drilling rig 118 is configured to pump drilling fluid 120a through the carrier 104 in order to lubricate the drill bit of the drilling assembly 112. The drilling fluid 120a becomes a flushing fluid 120b to flush cuttings from the borehole 102.

The measurement tools and/or downhole electronics 116 are configured generate data, i.e., collect data, at the downhole tools 110. Raw data and/or information processed by the downhole electronics 116 may be telemetered along telemetry 122 to the surface for additional processing or display by a computing system 124. In some configurations, drilling control signals are generated by the computing system 124 and conveyed downhole the downhole tools 110 or, in alternative configurations, are generated within the downhole electronics 116 or by a combination thereof. The downhole electronics 116 and the computing system 124 may each include one or more processors and one or more memory devices.

Figure 2:
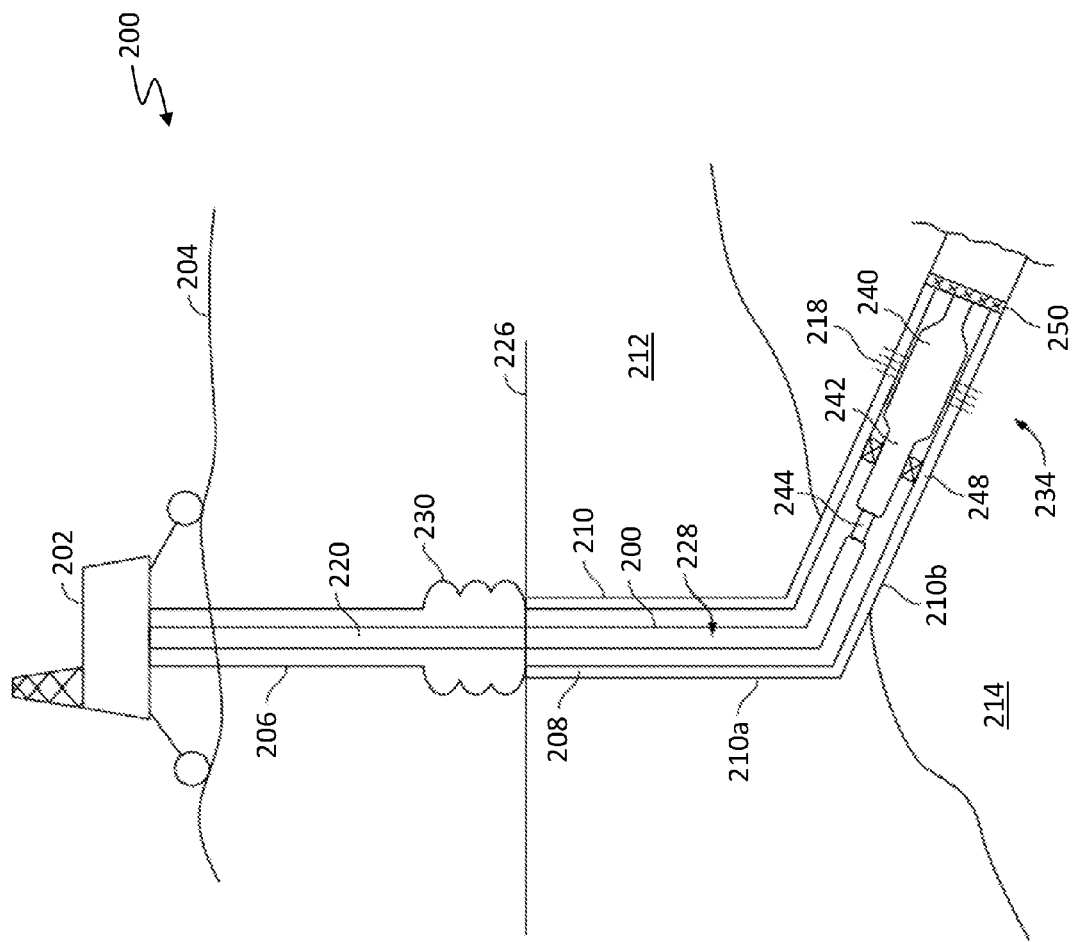
FIG. 2 is a schematic illustration of an embodiment of an offshore downhole completion system in accordance with an embodiment of the present disclosure.

Turning now to FIG. 2, a non-limiting example of a completion system 200 for delivery of a material to a formation according to one embodiment of the present disclosure is shown. The completion system 200 includes a rig platform 202 at a sea surface location 204 extending a tool string 220 downward past an ocean floor 226 into a borehole 210 in an earth formation 212. A riser 206 extends from the rig platform 202 to a blow-out preventer 230 at the ocean floor 226. The tool string 220 runs from rig 202 along riser 206 through the blow-out preventer 230 and into the borehole 210. In various embodiments, the tool string 220 can be a wired pipe and/or a drill pipe that is configured to convey various devices downhole for performing a fracturing or other completion operation. While the embodiment is shown in FIG. 2 with respect to an ocean rig platform 202, this is not meant as a limitation of the disclosure. The methods and apparatus disclosed herein are equally suitable for land operations (e.g., as shown in FIG. 1).

Although described with respect to a completion system 200 in FIG. 2, those of skill in the art will appreciate that the system can be any system used in delivery of a material such as frac fluid, proppant, sand, acid, etc. to a downhole location. Delivery of the material typically includes pumping of the material into the formation under a predetermined pressure. While the system is discussed herein with particular reference to a fracturing operation, any aspect of a completion operation wherein material is delivered to a downhole location can be performed using the system and methods disclosed herein. Various exemplary operations that can be performed using the illustrated system of FIG. 2 therefore include fracturing operations ("fracking"), gravel packing operations, acid stimulation operations, sand control operations, pumping a fluid into the formation, and pumping a proppant into a formation, among others.

The borehole 210 is shown to extend through the earth formation 212 and into a production zone or reservoir 214. The borehole 210 shown in FIG. 2 includes a vertical section 210a and a substantially deviated section 210b. Although shown at an angle, those of skill in the art will appreciate that the deviated section 210b can be horizontal or lateral in extent. The borehole 210 is lined with a casing 208 having a number of perforations 218. The tool string 220 is shown to include a portion that extends along the deviated section 210b of the borehole 210. As shown, as fracture tool assembly 234 ("frac assembly") is conveyed along the tool string 220 to a selected location that coincides with perforations 218. In some configurations, the tool string 220 defines an internal axial flowbore 228 along its length. During typical operations, various fluids and/or solids, such as fracturing fluid and/or proppant are sent downhole through the axial flowbore 228 and into the reservoir 214 via the frac assembly 234 and perforations 218. A proppant can be naturally occurring sand grains or man-made proppants such as resin-coated sand or high-strength ceramic materials like sintered bauxite.

As shown in the embodiment of FIG. 2, the frac assembly 234 can be isolated within the borehole 210 by a pair of packer devices 248 and 250. A sump packer 250 isolates a lower portion of the tool string 220 at an end of the tool string 220. Although only one frac assembly 234 is shown along the tool string 220, multiple frac assemblies may be arranged along the tool string 220. The one or more frac assemblies can be located in the vertical section 210a, deviated section 210b, or both the vertical 210a and deviated 210b sections of the borehole 210. In various embodiments, as noted above, the deviated section 210b of the borehole can be a substantially horizontal section.

The frac assembly 234 includes a screen 240 and a service tool 242 for controlling various operations of the frac assembly 234. The service tool 242 is configured to direct and control fluid flow paths, to maintain hydrostatic overbalance to the formation, and to facilitate various fracturing processes and/or gravel packing operations, among others. As shown, a sensor sub 244 is coupled to a top end of the service tool 242 and to a downhole end of the tool string 220. The sensor sub 244 is configured to measure various downhole parameters associated with fracturing operations. These measured downhole parameters can be used to control operation of a surface device for performing the fracturing operation according to the methods disclosed herein. In one embodiment, the sensor sub 244 is a modular device and includes an acoustic logging tool for generating acoustic logging data, including, but not limited to minimum horizontal stress ($S_{hmin}$) and brittleness index (BI) of the formation around the borehole 210. Further, the service tool 242 and/or the frac assembly 234 can include one or more perforation clusters, as known in the art. The perforation clusters can be used to perforate and fracture portions of the casing 208 and the reservoir 214.

During completion, prior to production, perforation clusters can be distributed within the borehole to enable perforation and fracturing of the formation thus enabling extraction of materials located within the downhole formations (e.g., reservoir 214). Completions using perforation clusters are extremely flexible multistage well completion techniques, and can be used, for example, with cased-hole wells. Each stage can be perforated and treated optimally because options can be exercised up to the moment a perforating gun is fired. Further, one can apply knowledge from each previous stage to optimize treatment of a current stage. The process consists of pumping a plug and perforating guns to a given depth. The plug is set, the zone perforated, and the tools removed from the well. A ball is pumped down to isolate the zones below the plug and the fracture stimulation treatment is pumped in. The ball-activated plug diverts fracture fluids through the perforations into the formation. After the stage is completed, the next plug and set of perforations are initiated, and the process is repeated moving further up the well.

Fracturing during the completion process, and orientation of the fractures, can be influenced by a number of factors. For example, in-situ stresses, overburden pressure, pore pressure, Poisson's Ratio, Young's Modulus, and fracture toughness can all play a role in fracture orientation. During the fracturing process, the fracture will be created perpendicular to the least principle stress ($S_{hmin}$). Further, the fracture will propagate (or grow) perpendicular to the least principle stresses.

Figure 3:
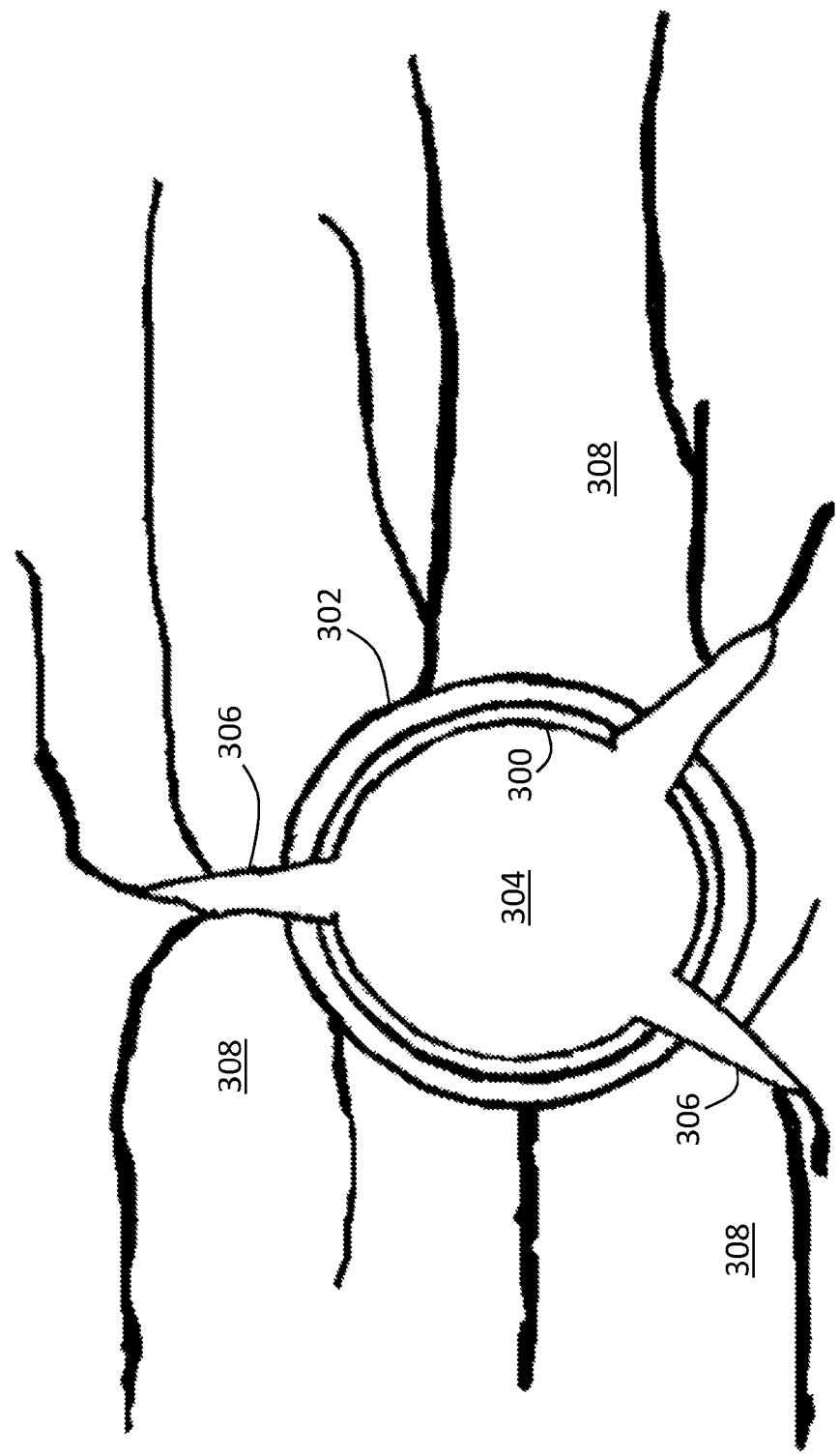
FIG. 3 is a schematic illustration of a perforated borehole and formation in accordance with an embodiment of the present disclosure.

Turning to FIG. 3, a schematic illustration of a perforation process is shown. In FIG. 3, a borehole has been drilled and a casing 300 is surrounded by a cemented annulus 302. A borehole 304 extends within the interior of the casing 300. A perforation process, e.g., as described above, was used to generate perforations 306 which are formed through the casing 300 and the cemented annulus 302 and extend into a formation 308. With the perforations 306 formed as shown, the formation 308 is now in fluid communication with the borehole 304 and fluid can flow from the formation 308 into the borehole 304 and extracted therefrom. During the completion process (e.g., perforating) optimal production is achieved when the perforations extend into the formation as initially modeled, i.e., where fluid is anticipated to be located. However, the above described factors can impact how the perforations are generated/formed and thus production is not always ensured as originally modeled. Accordingly, it is desirable to optimize the completion process to ensure the best possible perforations and fracturing.

Optimized completion can be difficult in lateral or horizontal wells or sections of wells. In vertical wells, a limited entry technique has been used that focused on vertical wells where the zones to be treated showed some important vertical extension in length and were unable to open just one set of perforations. The limited entry technique is designed to open several sets of perforations simultaneously by having each set or location of perforation clusters with the same or similar differential pressure across each perforation cluster at the moment of perforation. However, minimizing the differential pressures on all the sets of perforations has not been possible. Accordingly, even with this technique and a vertical well, there were some perforations that were not stimulated as planned.

In view of this, applying the limited entry technique to a horizontal well, without any modification, will likely increase probability of missing perforation clusters. Another model or technique is referred to as geometrical distribution, wherein the clusters for perforation are distributed based on geometric considerations. However, even geometrical distributions suffer from similar drawbacks as the limited entry technique. Thus, optimized completion of horizontal wells is desirable.

Those of skill in the art will appreciate that there is a high heterogeneity of a formation's properties along the lateral. These heterogeneities can be a result of changes in lithology, mineralogy, formation changes, faults, formation dips, etc., and/or due to changes in a drilling path along the lateral (changes in true vertical depth). When a completion is planned (e.g., a perforation and plug), making a set of perforations distributed geometrically along a single stage of the well is currently preferred. However, due to the heterogeneity of the formation, properties that will affect the initiation and development of hydraulic fractures at each of the perforation clusters will not be similar, thus making it difficult to distribute the hydraulic fracturing in a homogenous way along even a single stage.

As provided herein, acoustic logging data is used to optimize perforating and completion of a horizontal well. The acoustic data is obtained from within the lateral stage of the well in order to decrease the probability of having areas or perforation clusters unstimulated during completion. Embodiments provided herein are configured to enable changes in cluster location following a process based upon lateral characterization, supported by acoustic logging information from the lateral. Thus, an optimized completion can be achieved, resulting in a homogenous distribution of the hydraulic fracturing in all the clusters as a result of a decrease and a minimization of the differential net pressure (obtained from minimum horizontal stress values $S_{hmin}$) in all the clusters in a single stage. That is, embodiments provided herein define perforation cluster locations based on groupings of points where the $S_{hmin}$ behavior in the surrounding area provides the same level hydraulic fracture growth on both sides of the point.

Acoustic logging is used to obtain minimum horizontal stress profiles ($S_{hmin}$) and Brittleness Index (BI) along a lateral section on a horizontal well. The information is used to select perforation cluster placements into a completion program. That is, perforation cluster placement can be optimized based on minimum horizontal stress ($S_{hmin}$). For example, differential of net pressures (e.g., difference between min and max $S_{hmin}$ values of a particular stage) in all clusters within a single stage can be minimized, and further the effects of near-borehole friction can be minimized. The result can be optimal production using a homogeneous distribution of highly complex fractures induced hydraulically having a desired conductivity along the lateral. Through optimization, the number of perforation clusters per stage can be minimized without sacrificing perforation cluster spacing. A fewer number of perforation clusters can increase the probability to have zones with similar geomechanical properties, and thus there can be an increased likelihood for all zones to be homogeneously stimulated.

As noted, the acoustic data can be used to define minimum horizontal stress ($S_{hmin}$) and Brittleness Index (BI) for a lateral section (or stage) of the well. From this, areas or subsections having different parameters and/or properties can be identified. This information can be supplemented with information from mud logs, navigation logs, gamma ray logs, etc. that can be used to define productive and out-of-zone areas. From the collected information, different stages (or sub-stages) can be defined with locations and lengths with similar BI properties for each stage. That is, each stage can be configured and divided with similar BI properties.

Using the brittleness information (BI), a perforation cluster distribution can initially be based on geometrical criteria, as known in the art. That is, the numbers, length, and spacing of the perforation clusters can be initially defined based on geometrical criteria. Each perforation cluster will be assigned a position within a particular stage of the horizontal well. This will be referred to herein as an initial or first position.

After initial geometrical distribution is completed (e.g., the first position for each perforation cluster is defined), a minimum horizontal stress ($S_{hmin}$) is defined for the length of the stage. The minimum horizontal stress ($S_{hmin}$) is obtained for each first position of the stage. From this a differential net pressure can be calculated. The differential net pressure is the pressure difference between the first position having the highest minimum horizontal stress ($S_{hmin}$) and the first position having the lowest minimum horizontal stress ($S_{hmin}$). Next, the location of each perforation cluster can be adjusted to a second position. The second position is a location within the stage of the horizontal well that reduces the differential net pressure. That is, the location of each perforation cluster can be adjusted within the stage to minimize a delta or difference in $S_{hmin}$. During adjustment of the perforation cluster locations, the goal is to locate each perforation cluster in a $S_{hmin}$ valley wherein the values and fracturing behavior on both sides of the perforation cluster are expected to be the same or similar. After an initial adjustment (from first position to second position), the perforation cluster positions versus casing collars and other requirements may be checked. Further, the minimum horizontal stress ($S_{hmin}$) is defined for each second location and a differential net pressure is calculated again with the perforation clusters located at the second positions. The perforation clusters can be further adjusted in position to reduce or minimize the differential net pressure. That is, the process described above can be repeated multiple times to achieve a minimized differential net pressure.

Those of skill in the art will appreciate that the above described process can be a modeling process and calculation performed on the surface prior to deployment and operation of the perforating clusters. Further, in some embodiments, the adjustment of the location of the perforating clusters from the first position to the second position can be attempted to be minimized such that a deviation from the geometrical distribution is minimized.

Figure 4:
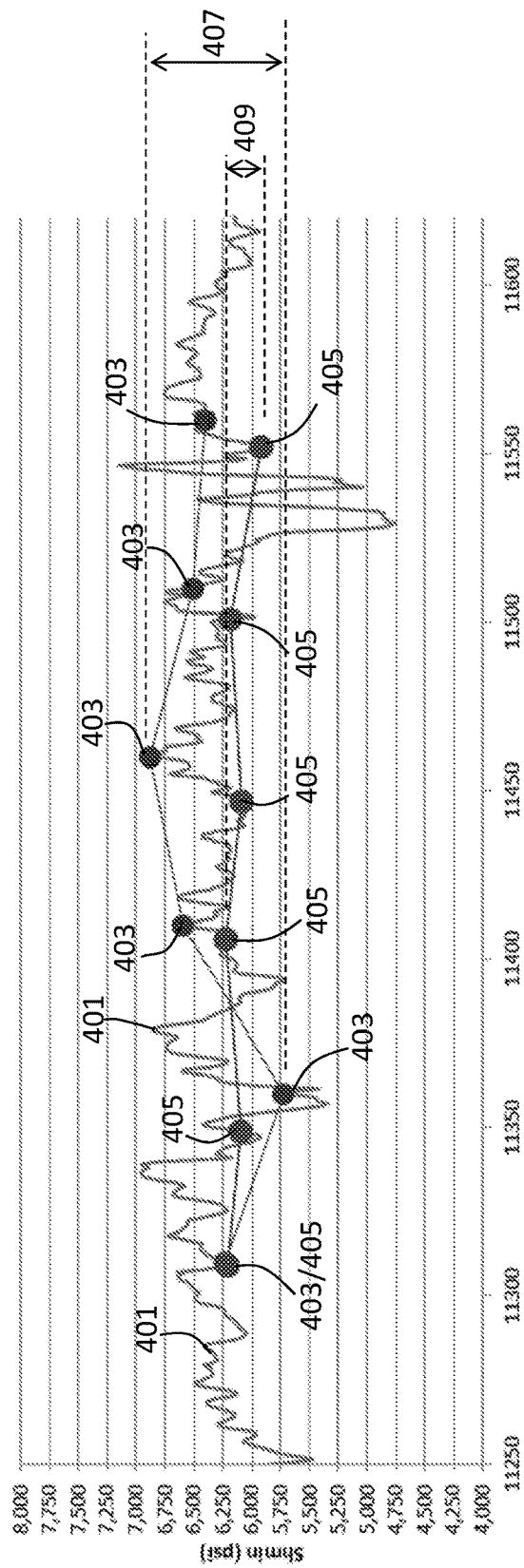
FIG. 4 is a schematic plot of minimum horizontal stress ($S_{hmin}$) and locations of perforation clusters as placed in accordance with an embodiment of the present disclosure.

The above described process is illustrated in FIG. 4. A plot illustrating a reduction in differential net pressure employing an embodiment of the present disclosure is shown. The plot of FIG. 4 shows a minimum horizontal stress curve 401 ($S_{hmin}$) over the span of a stage of a horizontal well. Using geometrical distribution for perforation cluster positions, first positions 403 of perforation clusters are indicated. As shown, because of the geometrical distribution, a first differential net pressure 407 for the geometrical points (first positions 403) is relatively large (e.g., as shown about 1150 psi). However, after using acoustic logging data to measure the minimum horizontal stress ($S_{hmin}$) along the length of the stage, the first positions 403 of the perforation clusters can be adjusted to second positions 405. The second positions 405 are relatively close (laterally) to each of the first positions 403, but the minimum horizontal stress ($S_{hmin}$) at each second position 405 is closer to the other minimum horizontal stress ($S_{hmin}$) values of the other second positions 405. As shown, a second differential net pressure 409 for the second positions 405 is significantly less (e.g., as shown about 305 psi) than that of the geometrically distributed perforation clusters (e.g., as shown, first differential net pressure 407).

Figure 5:
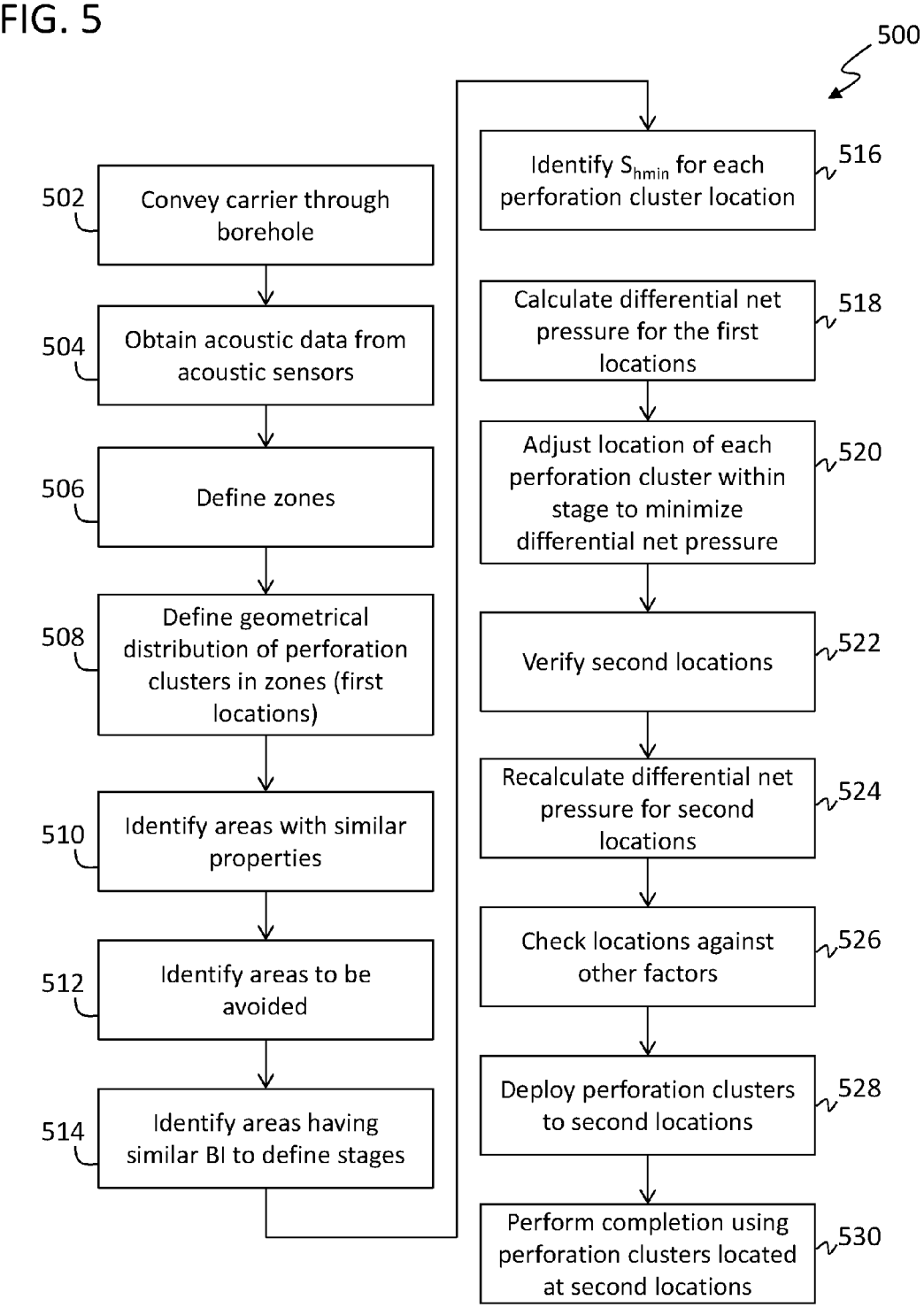
FIG. 5 is a flow process for positioning perforation clusters in a horizontal well in accordance with an embodiment of the present disclosure.

Turning now to FIG. 5, a flow process in accordance with a non-limiting embodiment of the present disclosure is shown. The flow process 500 can be performed using downhole tools and/or surface tools or computers as described above. The flow process 500 is a process for optimizing the location of perforation clusters for a completion process of a horizontal well.

At block 502, a carrier having one or more downhole components (e.g., downhole tools, electronics, etc.) is conveyed through a borehole. The downhole components are conveyed to a horizontal section of an extended reach well.

At block 504, the downhole components are employed to obtained data, including, but not limited to, acoustic data that includes pressure, stress, and/or brittleness information. The data collection can include any evaluations from geosciences. Two specific pieces of information to be collected are minimum horizontal stress ($S_{hmin}$) and Brittleness Index (BI).

At block 506, multiple zones for perforating are defined. The zones may be based on various criteria, including but not limited to, the number of perforation clusters to be deployed, the length of the horizontal section, and/or other criteria related to the borehole and/or the downhole formation in the earth. The identification of zones can be based on mud logs, navigation logs, gamma ray logs, etc. For consideration may be made for zones or areas that had drilling problems and/or losses, lithological or petrophysical properties, geological faults, and/or natural fractures.

At block 508, based on the defined zones, first locations of perforation cluster locations are defined within the zones. The first locations are based on a geometrical distribution, as known in the art. The first locations can be selected, in part, based on relationship to carrier collars and/or any other restrictive locations (e.g., fiber optic protectors, etc.).

At block 510, from the data collected at block 504, various areas of the formation along the horizontal well within the zones having similar geomechanical or other properties are identified and grouped. The grouping achieved from block 510 may be related to rock or material properties of the formation (e.g., lithology, gas shows, etc.).

Similarly, at block 512, the data collected at block 504 can be used to identify one or more areas that should be avoided due to geological reasons. For example, areas that have natural faults and/or changes in formation properties are likely to be avoided during the perforation process.

At block 514, the brittleness index obtained at block 504 is used to identify areas with similar BI values. The areas having similar BI values will be grouped to form stages for perforation and fracturing along the horizontal well.

At block 516, the minimum horizontal stress ($S_{hmin}$) for each first location of the perforation clusters is identified. From this, a differential net pressure is calculated for all first positions, as shown at block 518. This calculation is the difference in value between the first location having the highest minimum horizontal stress ($S_{hmin}$) and the first location having the lowest minimum horizontal stress ($S_{hmin}$) in a single stage.

At block 520, the location of each perforation cluster is adjusted relative to the respective first location such that the differential new pressure is reduced for the entire stage. That is, the location of the perforation clusters is adjusted to a second location wherein the second location, in aggregate, defines a lower differential net pressure. In some embodiments, the change in location from the first location to the second location is to be minimized such that the approximate positions based on the geometrical distribution are maintained. Further, in some embodiments, the adjusting of the position from the first position to the second position is based on locating a particular perforation cluster in a value of the minimum horizontal stress ($S_{hmin}$) data set obtained at block 504.

At block 522, the second locations of the perforation clusters are verified. The verification is made with respect to ensure that the adjustment for purposes of minimum horizontal stress ($S_{hmin}$) do not place a perforation cluster in alignment with a natural fracture. If any of the second locations are aligned with a natural fracture, the individual second location can be adjusted such that the second location does not touch a natural fracture while minimizing the differential net pressure.

At block 524, the differential net pressure for the second locations is calculated. If further minimization of the differential net pressure can be achieved, the process can repeat blocks 520-524, with the second adjustment being from the second locations to third locations, wherein the third locations achieve a reduction in the differential net pressure of the stage.

Once the adjustment of the location of the perforation clusters is complete, the locations of the perforation clusters can be checked against other factors to ensure proper fracturing will be achieved, as shown at block 526. For example, the location of the perforation clusters can be checked against casing collars and any other restrictions that exist in the casing (e.g., fiber optic blast protectors, etc.). If any issues are detected, the positions and locations can be adjusted slightly to accommodate the additional factors.

At block 528, with the location finalized, the perforation clusters can be deployed into the carrier and positioned as defined by blocked 504-526. Finally, with the perforation clusters located where desired, the perforation process and completion can be carried out.

Set forth below are some embodiments of the foregoing disclosure:

Embodiment 1: A method for optimizing the placement of perforation clusters in a horizontal well for completion of said well, the method comprising: conveying a carrier through a borehole into a horizontal section of the borehole; obtaining acoustic data using one or more acoustic sensors; defining a first location for each of a plurality of perforation clusters based on a geometrical distribution; identifying a minimum horizontal stress ($S_{hmin}$) for each first location based on the acoustic data; calculating a differential net pressure for the first locations based on the minimum horizontal stress ($S_{hmin}$) for each first location; adjusting the location of each of the plurality of perforation clusters to a respective second location such that the differential net pressure of the second locations is less than the differential net pressure of the first locations; and deploying a plurality of perforation clusters to the second locations such that fracturing of a formation at the second locations is achieved.

Embodiment 2: The method of embodiment 1, wherein the acoustic data includes brittleness index values, the method further comprising defining a stage of the horizontal section of the well wherein the stage comprises a zone of similar brittleness index values, wherein the first locations and second locations are within the stage.

Embodiment 3: The method of any of the above embodiments, further comprising processing the acoustic data to identify areas of the horizontal section of the well having similar properties.

Embodiment 4: The method of any of the above embodiments, further comprising processing the acoustic data to identify areas of the horizontal section of the well to be avoided such that the second locations are not located in the areas to be avoided.

Embodiment 5: The method of any of the above embodiments, further comprising verifying the second locations against known information to determine if any of the second locations aligns with a natural fault, wherein if any of the second locations are aligned with a natural fault, the second location that aligns with the natural fault is further adjusted to no longer align with the natural fault.

Embodiment 6: The method of any of the above embodiments, further comprising calculating a differential net pressure for the second locations, and adjusting the location of the plurality of perforation clusters to a plurality of third locations wherein the third locations have a lower differential net pressure than the second locations.

Embodiment 7: The method of any of the above embodiments, further comprising performing a perforation operation with the plurality of perforation clusters located at the second locations.

Embodiment 8: A system for optimizing the placement of perforation clusters in a horizontal well for completion of said well, the system comprising: a carrier configured to be conveyed through a borehole; at least one sensor configured to obtain acoustic data downhole; and a processor configured to optimize placement of a plurality of perforation clusters in a second of horizontal well, the system configured to: obtain acoustic data using the at least one sensor; define a first location for each of a plurality of perforation clusters based on a geometrical distribution; identify a minimum horizontal stress ($S_{hmin}$) for each first location based on the acoustic data; calculate a differential net pressure for the first locations based on the minimum horizontal stress ($S_{hmin}$) for each first location; and adjust the location of each of the plurality of perforation clusters to a respective second location such that the differential net pressure of the second locations is less than the differential net pressure of the first locations.

Embodiment 9: The system of any of the above embodiments, wherein the acoustic data includes brittleness index values, the system further configured to define a stage of the horizontal section of the well wherein the stage comprises a zone of similar brittleness index values, wherein the first locations and second locations are within the stage.

Embodiment 10: The system of any of the above embodiments, the system further configured to process the acoustic data to identify areas of the horizontal section of the well having similar properties.

Embodiment 11: The system of any of the above embodiments, the system further configured to process the acoustic data to identify areas of the horizontal section of the well to be avoided such that the second locations are not located in the areas to be avoided.

Embodiment 12: The system of any of the above embodiments, the system further configured to process verify the second locations against known information to determine if any of the second locations aligns with a natural fault, wherein if any of the second locations are aligned with a natural fault, the second location that aligns with the natural fault is further adjusted to no longer align with the natural fault.

Embodiment 13: The system of any of the above embodiments, the system further configured to process calculate a differential net pressure for the second locations, and adjusting the location of the plurality of perforation clusters to a plurality of third locations wherein the third locations have a lower differential net pressure than the second locations.

Embodiment 14: The system of any of the above embodiments, the system further configured to perform a perforation operation with the plurality of perforation clusters located at the second locations.

The systems and methods described herein provide various advantages. For example, various embodiments provided herein may provide improved and/or efficient completion processes for horizontal wells. Various embodiments can maximize and/or otherwise optimize the location of perforation clusters for completion processes by ensuring locating the perforation cluster at ideal locations for perforation and fracturing.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/ or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" do not denote a particular order, but are used to distinguish different elements.

The flow diagram depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A method for performing a perforation cluster operation in a horizontal well for completion of said well, the method comprising:
    defining a preliminary first location for each of a plurality of perforation clusters based on a geometrical distribution;
    conveying a carrier through a borehole into a horizontal section of the borehole, wherein the plurality of perforation clusters are positioned at the respective preliminary first locations;
    obtaining acoustic data using one or more acoustic sensors, wherein the acoustic data comprises minimum horizontal stress ($S_{hmin}$) along the horizontal section of the borehole;
    identifying a minimum horizontal stress ($S_{hmin}$) for each preliminary first location based on the acoustic data;
    calculating a differential net pressure for each preliminary first location based on the minimum horizontal stress ($S_{hmin}$) for each preliminary first location;
    adjusting the location of each of the plurality of perforation clusters to a respective second location such that the differential net pressure of the second locations is less than the differential net pressure of the preliminary first locations; and
    activating the plurality of perforation clusters at the respective second locations to perform a perforation operation such that fracturing of a formation at the second locations is achieved.

2. The method of claim 1, wherein the acoustic data includes brittleness index values, the method further comprising defining a stage of the horizontal section of the well wherein the stage comprises a zone of similar brittleness index values, wherein the first locations and second locations are within the stage.

3. The method of claim 1, further comprising processing the acoustic data to identify areas of the horizontal section of the well having similar properties.

4. The method of claim 1, further comprising processing the acoustic data to identify areas of the horizontal section of the well to be avoided such that the second locations are not located in the areas to be avoided.

5. The method of claim 1, further comprising verifying the second locations against known information to determine if any of the second locations aligns with a natural fault, wherein if any of the second locations are aligned with a natural fault, the second location that aligns with the natural fault is further adjusted to no longer align with the natural fault.

6. The method of claim 1, further comprising calculating a differential net pressure for the second locations, and adjusting the location of the plurality of perforation clusters to a plurality of third locations wherein the third locations have a lower differential net pressure than the second locations.

7. A system for optimizing the placement of perforation clusters in a horizontal well for completion of said well, the system comprising:
  a carrier configured to be conveyed through a borehole;
  at least one sensor configured to obtain acoustic data downhole; and
  a processor configured to optimize placement of a plurality of perforation clusters in a section of horizontal well, the system configured to:
    define a first preliminary location of each of a plurality of perforation clusters based on a geometrical distribution;
    obtain acoustic data using the at least one sensor after the carrier is conveyed into the borehole such that the plurality of perforation clusters are arranged proximate the first preliminary locations;
    identify a minimum horizontal stress ($S_{hmin}$) for each preliminary first location based on the acoustic data;
    calculate a differential net pressure for each preliminary first location based on the minimum horizontal stress ($S_{hmin}$) for each preliminary first location; and
    adjust the location of each of the plurality of perforation clusters to a respective second location such that the differential net pressure of the second locations is less than the differential net pressure of the preliminary first locations.

8. The system of claim 7, wherein the acoustic data includes brittleness index values, the system further configured to define a stage of the horizontal section of the well wherein the stage comprises a zone of similar brittleness index values, wherein the first locations and second locations are within the stage.

9. The system of claim 7, the system further configured to process the acoustic data to identify areas of the horizontal section of the well having similar properties.

10. The system of claim 7, the system further configured to process the acoustic data to identify areas of the horizontal section of the well to be avoided such that the second locations are not located in the areas to be avoided.

11. The system of claim 7, the system further configured to process verify the second locations against known information to determine if any of the second locations aligns with a natural fault, wherein if any of the second locations are aligned with a natural fault, the second location that aligns with the natural fault is further adjusted to no longer align with the natural fault.

12. The system of claim 7, the system further configured to process calculate a differential net pressure for the second locations, and adjusting the location of the plurality of perforation clusters to a plurality of third locations wherein the third locations have a lower differential net pressure than the second locations.

13. The system of claim 7, the system further configured to perform a perforation operation with the plurality of perforation clusters located at the second locations.

* * * * *